United States Patent
Parekh et al.

[11] Patent Number: 6,031,226
[45] Date of Patent: Feb. 29, 2000

[54] INTEGRATED VENTILATION MODE AND TEMPERATURE CONTROL SYSTEM FOR VEHICLES

[75] Inventors: Bipin D. Parekh, Plymouth; Jordan M. Stevenson, Walled Lake; Fred W. Butler, Oxford, all of Mich.

[73] Assignees: TRW, Inc., Cleveland, Ohio; Ford Motor Company, Dearborn, Mich.

[21] Appl. No.: 09/105,164

[22] Filed: Jun. 26, 1998

Related U.S. Application Data

[63] Continuation-in-part of application No. 08/661,936, Jun. 11, 1996, Pat. No. 5,881,994.

[51] Int. Cl.[7] .......................... F16K 31/53; F16K 31/46; B60H 1/02
[52] U.S. Cl. ..................... 250/250.5; 251/294; 454/160
[58] Field of Search ............................... 251/250.5, 294; 74/89.22; 454/159, 160

[56] References Cited

U.S. PATENT DOCUMENTS

| | | | |
|---|---|---|---|
| 1,501,340 | 7/1924 | Hirschler | 251/250.5 |
| 2,220,431 | 11/1940 | Strehs | 251/250.5 X |
| 2,583,050 | 1/1952 | Harrower | 251/250.5 |
| 3,823,617 | 7/1974 | Infanger et al. | 74/498 |
| 4,509,387 | 4/1985 | Tschanz et al. | 251/294 X |
| 4,535,932 | 8/1985 | Herb | 251/294 X |
| 4,537,114 | 8/1985 | Izaki | 454/160 |
| 4,646,206 | 2/1987 | Bauer et al. | 454/159 X |
| 4,656,926 | 4/1987 | Bauer et al. | 251/294 X |
| 5,127,280 | 7/1992 | Terano et al. | 454/159 X |
| 5,235,866 | 8/1993 | Truman et al. | 74/89.22 |

*Primary Examiner*—John Rivell
*Attorney, Agent, or Firm*—Fay, Sharpe, Fagan, Minnich & McKee, LLP

[57] ABSTRACT

A rotary temperature control system for use in controlling the temperature of a blended air stream supplied to a vehicle passenger compartment is combined with a rotary ventilation mode control system in a common housing. The ventilation mode and temperature control systems include manually operable rotary control knobs operatively connected through pull-pull cable systems to gears in the housing that operate a temperature blend door controlling the output temperature of a blended air stream and one or more vent dampers controlling the ventilation mode of the system. A drive connection in the housing includes irregularly shaped gears for producing a predetermined generally non-linear relationship between rotary movement of an input control member and rotary movement of the temperature blend door to produce a generally linear relationship between the rotary movement of the temperature control knob and the temperature of the air stream throughout a major portion of the rotary movement of the control knob.

16 Claims, 8 Drawing Sheets

INTEGRATED VENTILATION MODE AND TEMPERATURE CONTROL SYSTEM FOR VEHICLES

CROSS-REFERENCE TO RELATED APPLICATIONS

This is a continuation-in-part of Application Ser. No. 08/661,936, filed Jun. 11, 1996 now U.S. Pat. No. 5,881,994.

BACKGROUND OF THE INVENTION

The subject invention is directed to climate control systems for passenger compartments of motor vehicles and, more particularly, to an integrated ventilation mode and temperature control system for controlling the source, temperature, and supply of air delivered to the passenger compartment of a motor vehicle.

In typical motor vehicle heating and air conditioning systems, temperature control is accomplished by adjusting the position of a blend door located in the passenger compartment air supply system duct work. Often, a rotary knob located at the vehicle dashboard or control panel is drivingly connected to the temperature blend door through a mechanical cable or linkage arrangement. The loads required to operate the temperature blend door have generally required relatively rigid control cables and linkages.

Also in typical motor vehicle climate control systems, the ventilation mode is determined by the setting or position of one or more vent dampers located in the air supply system duct work either upstream, downstream, or both with respect to the temperature blend door. The position of a first, or source, vent damper blends recirculated passenger compartment air with outside air. The position of a second, or supply, vent damper determines the path or routing in which the conditioned air moves toward the various outlets into the passenger compartment such as, for example, upward toward the windshield to perform a "defrost" function, downward toward the vehicle floor to perform a "heater" function or midway toward the vehicle occupant to perform a "vent" function. Similar to the temperature blend door control described above, the setting of the one or more vent dampers are controlled by a rotary knob or slidable lever located at the dashboard or control panel of the motor vehicle. The loads required to operate the ventilation mode control dampers have generally required rigid control cables and linkages.

Various proposals to simplify or improve the drive connection between the operating knobs or slide levers and the blend doors or dampers have been presented. However, problems with respect to high operating rotational or sliding force requirements have persisted. Also, the routing of the sometimes rigid drive connections between the knobs, slide levers, blend doors, and dampers adds to the complexity and expense of systems of this type. In addition, readjustment of control cable linkage after installation has also been a problem.

A further drawback to prior systems has been the difficulty of achieving a linear relationship between knob movement and output air temperature. Generally, this has only been achievable through the use of electronic systems or by a mechanical system of cams and rigid push-pull cables. The electronic systems are costly, and the systems incorporating rigid push-pull cables present difficult routing problems, such as described above, that substantially limit their use.

Yet another disadvantage of prior climate control systems of the type considered is that the temperature control and ventilation mode control aspects are typically not integrated into a single unitary drive system for converting linear or rotary movement of control levers and knobs to blend door or vent damper position. The prior systems require a separate housing structure for each function, and thus use separate sub-assemblies for each of the temperature control and ventilation mode mechanisms. A result is that systems of this type are expensive and difficult to install into vehicles on an assembly line during manufacture or in motor vehicle repair shops afterwards. Also, the separate temperature and mode control housings consume a substantial volume of space and often require special mounting accommodations in the dashboard of the motor vehicle.

SUMMARY OF THE INVENTION

The subject invention provides an improvement to passenger vehicle climate control systems of the type described which produces a near linear relationship between temperature control knob rotation and output air temperature and further provides an integration of both temperature and ventilation mode control drive components into a single unitary housing. In addition, the invention results in a much smaller and lightweight climate control apparatus that is easy to assemble. This allows for a more efficient use of motor vehicle assembly line personnel and generally for a more efficient allocation of assembly plant resources. It further allows for a better utilization of the space behind the dashboard resulting in vehicles having larger passenger compartment space. Moreover, the invention provides a near linear relationship between the rotary movement of a temperature control knob and the temperature of an air stream flowing into the vehicle passenger compartment. The operating force required to actuate the manual knob is substantially uniform over its operating range.

In accordance with the subject invention, there is provided an integrated ventilation mode and temperature control apparatus for use with a passenger compartment climate control system of a motor vehicle. A housing is provided and a moveable temperature output control member is disposed at the housing for driving a temperature blend door that controls the output temperature of a blended air stream in the climate control system. A moveable ventilation mode output control member is similarly disposed at the housing for driving one or more ventilation mode dampers that control the source and routing of the blended air stream in the climate control system. A temperature input control member is disposed at the housing and is moveable in response to motion of an operatively associated manually operable temperature control knob spaced apart from the housing, preferably within the passenger compartment of the motor vehicle. A ventilation mode input control member is disposed at the housing and is moveable in response to motion of an operatively associated manually operable ventilation mode control knob spaced apart from the housing and also preferably positioned in the passenger compartment. A first drive unit is contained within the housing and provides a first drive connection between the ventilation mode input control member and the ventilation mode output control member for producing movement of the ventilation mode output control member in response to movement of the ventilation mode input control member. The temperature input control member and the temperature output control member are connected by a second drive unit disposed in the housing for producing a predetermined generally non-linear relationship between movement of the temperature input control member and movement of the temperature output control member to produce a generally linear relationship between the movement of the manually operable temperature control knob and the temperature of the blended air stream throughout a major portion of movement of the temperature control knob.

In accordance with a further aspect of the invention, the temperature input and output control members are rotary shafts extending from the housing along first and second parallel axes. Further, the ventilation mode input and output control members are also rotary output shafts extending from the housing along third and fourth parallel axes. In its preferred form, the second drive unit includes a pair of interengaged non-circular shaped gears having an irregular contour positioned to transmit the rotary movement of the temperature input control member to the rotary movement of the temperature output control member so that a near linear relationship is established between the movement of the manually operable temperature control knob and the temperature of the air stream throughout a major portion of the movement of the temperature control knob.

The use of the described drive arrangement in the second drive unit allows the irregularly shaped gears to be designed so as to provide the necessary non-linear movement of the temperature output control member in response to linear movement of the manually operable temperature control knob. This, in turn, allows a linear relationship between the rotary movement of the manually operable temperature control knob relative to the temperature of the blended air stream. The non-circular shaped gears are also formed so that the forces required for temperature control knob movement remain substantially constant throughout a major portion of rotary movement thereof while maintaining the substantially linear relationship between the position of the control knob and the temperature of the blended air stream. Thus, the passenger using the knob does not experience any undesirably high or excessive torque forces at any point in the control range.

In its preferred form, the first and second drive units, including the housing, as well as the non-circular shaped gears, are made of plastic and constitute a relatively small, lightweight assembly that can be directly connected to the temperature blend door and the one or more ventilation mode dampers.

In view of the above, it is a primary object of the invention to provide a manually operable, mechanically interconnected ventilation mode and temperature control apparatus wherein a single housing is provided for containing first and second drive units associated with the ventilation mode input and output control members and the temperature input and output control members, respectively.

A further object of the invention is the provision of a drive unit that generates a non-linear rotary output in response to a linear rotary input so that the resulting temperature of a blended air stream will have a linear relationship to the linear input.

A further object of the invention is the provision of an integrated rotary ventilation mode and temperature control apparatus of the general type described which is highly compact and relatively inexpensive to manufacture and assemble.

Yet another object of the invention is the provision of a temperature control system that is simple to install in a motor vehicle because the drive interconnection between the temperature and ventilation mode control knobs, the temperature blend door, and one or more ventilation mode dampers are flexible and can take substantially any shape to accommodate any desired routing.

Still other advantages and benefits will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
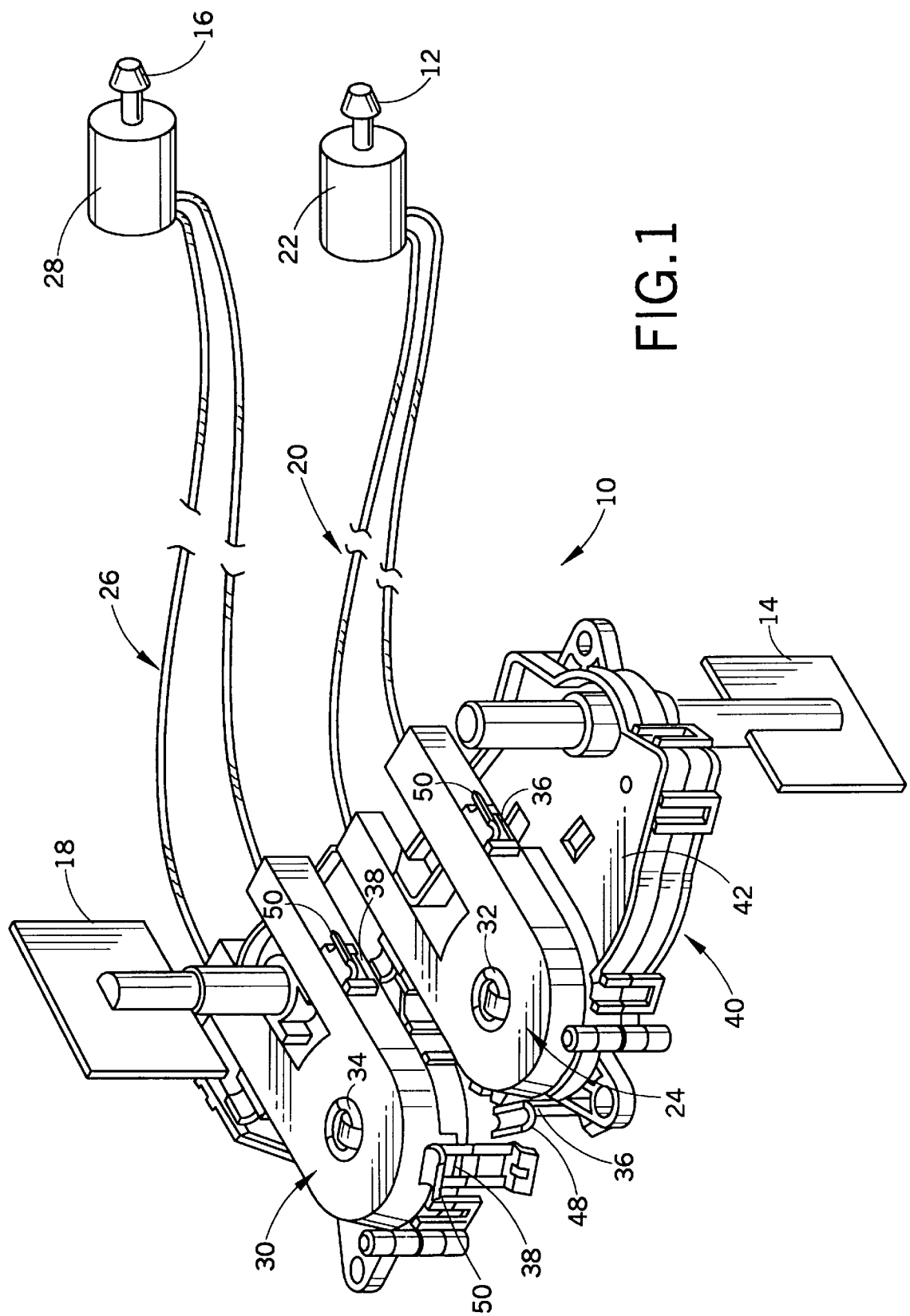
FIG. 1 is a somewhat diagrammatic pictorial view showing the overall arrangement of an integrated ventilation mode and temperature control system formed in accordance with a preferred embodiment of the subject invention.

Referring now to the drawings wherein the showings are for the purposes of illustrating the preferred embodiment of the invention only and not for purposes of limiting same, FIG. 1 shows the overall arrangement of an integrated ventilation mode and temperature control system 10 for controlling the source, temperature, and supply of air delivered to the passenger compartment of a motor vehicle.

In the system illustrated, a rotary, manually operable temperature control knob 12 is mechanically, drivingly interconnected with a temperature blend door 14 that acts to selectively blend or mix hot and cold temperature modified air to produce a desired temperature blended output stream for delivery to the passenger compartment of a motor vehicle. Further as illustrated, a rotary, manually operable ventilation mode control knob 16 is mechanically, drivingly interconnected with one or more ventilation mode vent dampers 18 that act to blend recirculated passenger compartment air with outside air and to determine the path or routing through which the conditioned air moves towards the various outlets and into the passenger compartment.

In the subject embodiment, the temperature control knob 12 is connected to a drive means and gear system 40 contained within a plastic housing 42 via a temperature pull-pull cable system 20. Similarly, the ventilation mode control knob 16 is connected to the gear system 40 via a ventilation mode pull-pull cable system 26. On one end of the temperature pull-pull cable system 20, a temperature knob detent assembly 22 is provided for interfacing the temperature control knob 12 to the subject control system 10. In that regard, the temperature knob detent assembly 22 converts rotary movement of the temperature control knob 12 into linear movement in a pair of jacketed flexible cables comprising the temperature pull-pull cable system. On the other end, a temperature drive cable connector 24 is provided for interfacing the temperature pull-pull cable system with the gear system 40. The temperature drive cable connector converts linear motion of the temperature pull-pull cable system into the desired rotary motion at the gear system 40. The temperature drive cable connector is adapted for selective connection to the plastic housing 42 for easy manual assembly in a manner to be subsequently described below. The ventilation mode pull-pull cable system 26 similarly includes a ventilation mode knob detent assembly 28 on one end and a ventilation mode drive cable connector 30 on the other end for providing an interface between the ventilation mode control knob 16 and the gear system 40 and housing 42.

Figure 5:
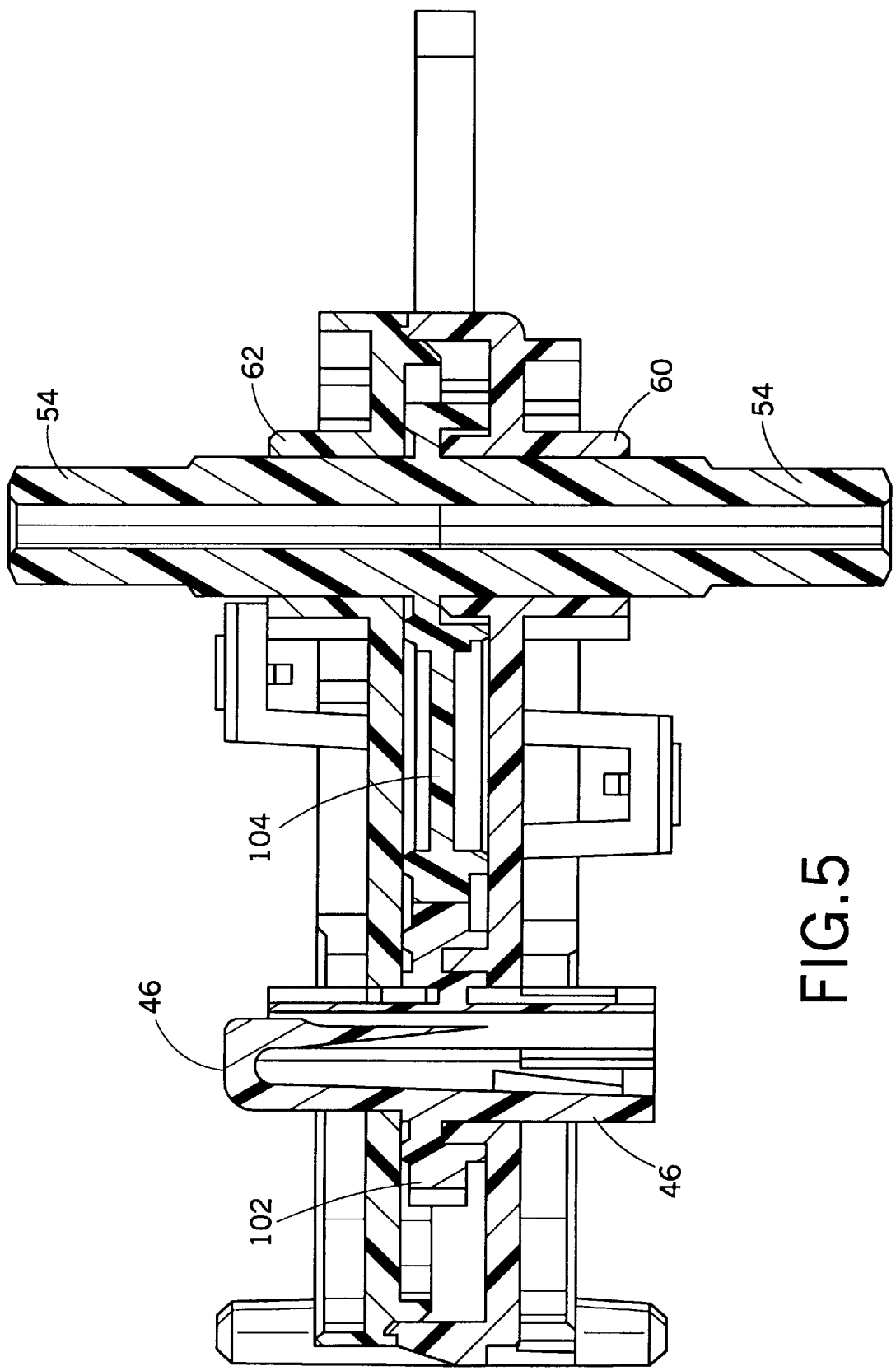
FIGS. 5 and 6 are cross-sectional views taken on lines 5—5 and 6—6 of FIG. 2, respectively.

Each of the temperature and ventilation mode drive cable connectors 24,30 include an internal annular rotatable connector member 32, 34 and a set of outer or external engagement tabs 36, 38, respectively. The temperature annular connector member 32 is slidably engageable onto either end of an elongate temperature input control member 44 extending from both sides of the housing 42 as shown best in FIG. 6. Likewise, the ventilation mode annular connector member 32 is slidably engageable onto either end an elongate ventilation mode control member 46 extending from both sides of the housing as shown best in FIG. 5. Preferably, the annular connector members 32, 34 have internal keyed splines that are engageable with elongate matching external keyed splines provided on the corresponding control members 44, 46.

In order to enable the temperature and ventilation mode drive cable connectors 24, 30 to be easily snap connected with the gear system 40, the housing 42 includes a first and second set of resilient engagement latches 48, 50 that are arranged as illustrated and adapted to interengage a respective set of engagement tabs 36, 38 on the temperature and ventilation drive cable connectors to hold the drive cable connectors in position against the housing. Preferably, the engagement tabs have a lead-in ramp portion and the set of engagement latches include a corresponding ramp area aligned in registration with the tab lead-in ramps so that each of the temperature and ventilation mode drive cable connectors can be easily hand assembled onto the housing 42. In the position illustrated in FIG. 1, rotary movement of the manual temperature and ventilation mode control knobs 12, 16 causes a corresponding rotary movement of the temperature and ventilation control members 44, 46, respectively.

The gear system 40 provides the drive connection between the pull-pull cable systems 20, 26 and temperature and ventilation mode control members 52, 54 which operate the temperature blend door 14 and the one or more ventilation mode vent dampers 18, respectively. The gear system is particularly designed to produce a predetermined, generally non-linear relationship between the rotary movement of the temperature control knob 12 and the rotary movement of a temperature output control member 52 to produce a generally linear relationship between the rotary movement of the temperature control knob 12 and the temperature of the blended air stream supplied to the passenger compartment throughout a major portion of the rotary movement of the temperature control knob. As will subsequently be described in some detail, this is accomplished through the use of continuously variable ratio, non-circular shaped gearing having an irregular contour to compensate for the non-linear relationship between the temperature blend door movement and the mix ratio produced between the temperature modified blend air streams. The preferred form of the gear system 40 can best be understood by reference to FIGS. 2–6.

Figure 2:
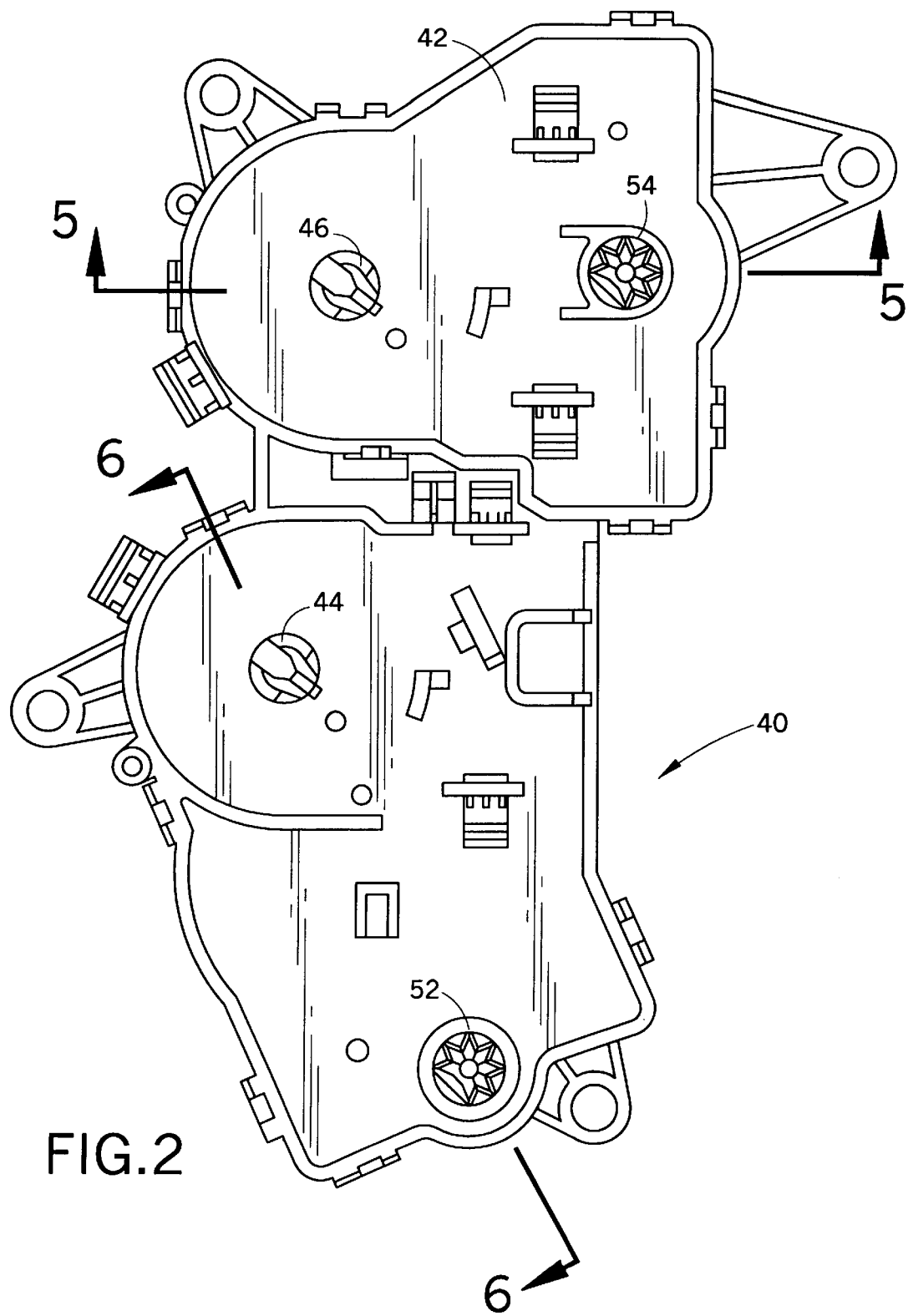
FIG. 2 is a top plan view showing the housing of FIG. 1 with the temperature and ventilation mode flexible drive assemblies removed therefrom.
Figure 3:
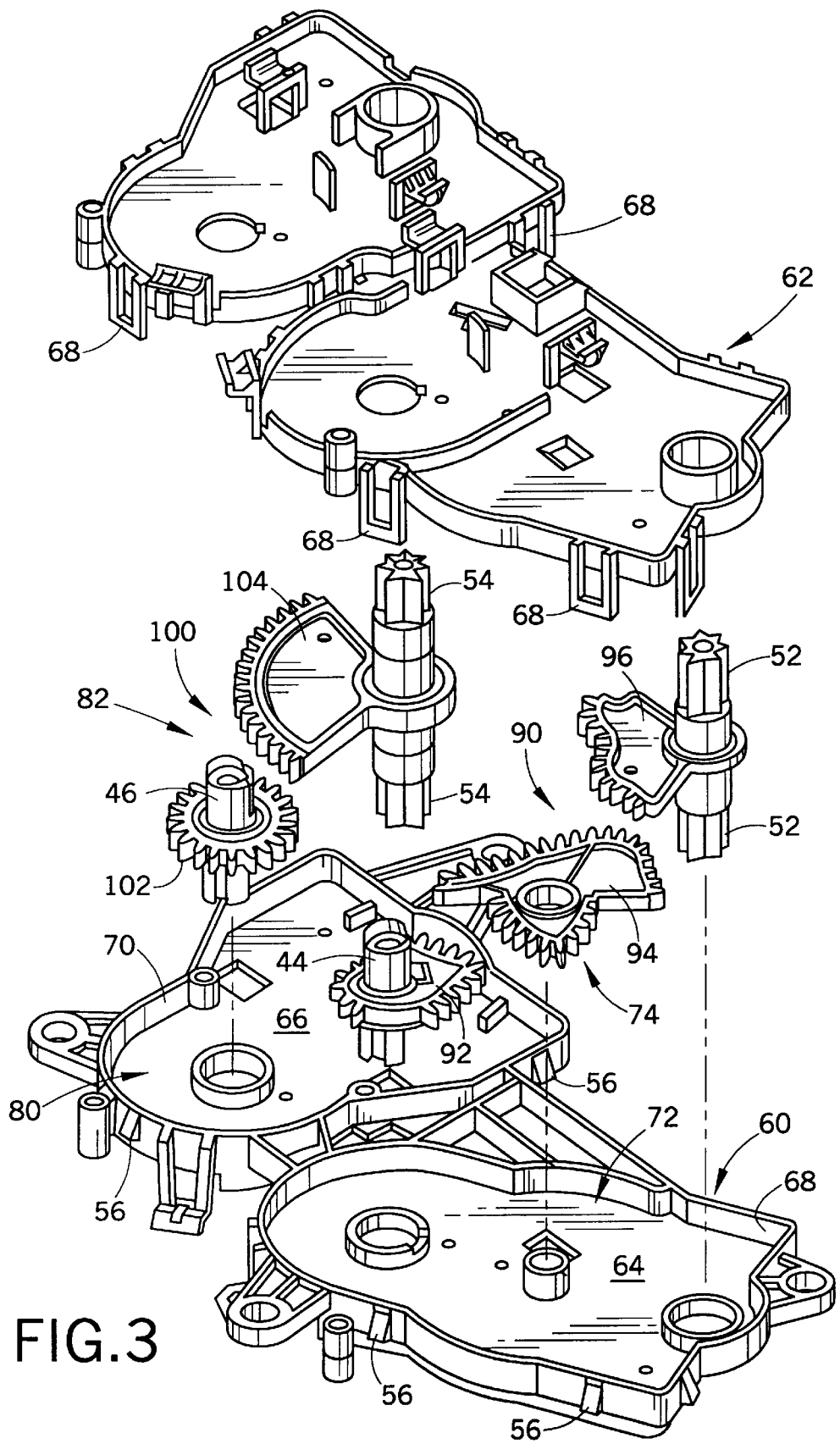
FIG. 3 is an exploded isometric view of the drive assembly of FIG. 2.

As particularly shown in FIGS. 2 and 3, gear system 40 includes an outer rigid housing 42 that generally comprises a lower housing component 60 and a cover or upper housing component 62 that is suitably joined thereto in any convenient manner, such as by mechanical fasteners, welding, or the like. Preferably as illustrated however, the lower housing component 60 is provided with a set of engagement tabs 56 that are positioned and adapted to register with and engage a corresponding set of resilient engagement latches 68 provided on the upper housing component 62 as shown. The tabs and latches on the housing 42 enable the subject temperature control system to be easily assembled by snap-fitting the components together. The housing components could be formed from a variety of different materials but, in the preferred embodiment, are molded plastic components formed from a relatively high strength plastic such as ABS.

The lower housing component 60 includes a pair of base or bottom walls 64, 66 and a pair of integral, upwardly extending peripheral walls 68, 70. As shown best in FIG. 3, the bottom and peripheral walls 64, 68 define a temperature control gear chamber 72 adapted to contain a temperature drive unit 74 for providing a drive connection between the input temperature control member 44 and the output temperature control member 52. Similarly, the bottom and peripheral walls 66, 70 shown on the left in FIG. 3 define a ventilation mode control gear chamber 80 adapted to contain a ventilation mode drive unit 82 for providing a drive connection between the ventilation mode input control member 46 and the output ventilation mode control member 54.

Figure 4:
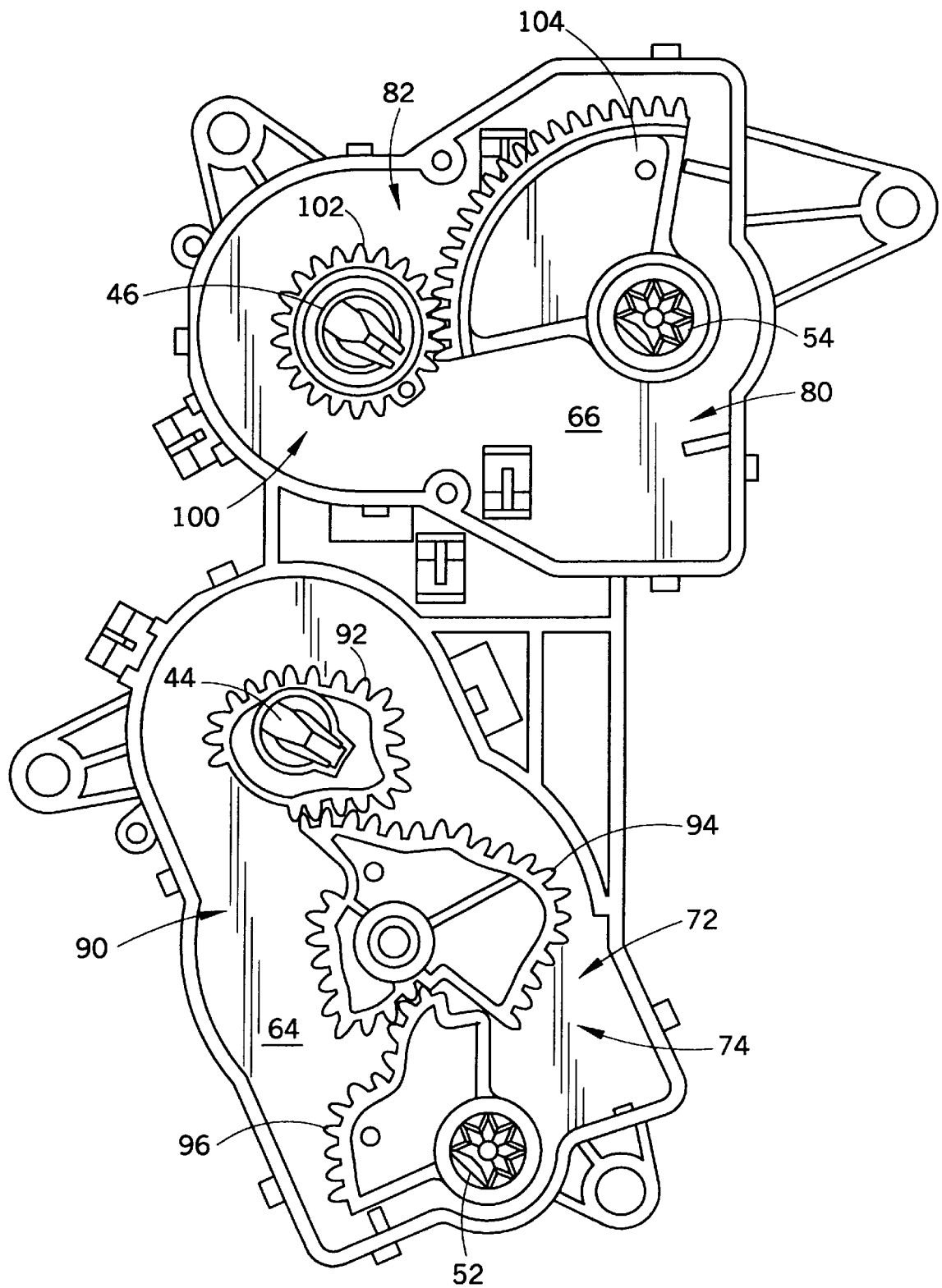
FIG. 4 is a top plan view of the drive assembly with the upper half of the housing removed to clearly show the arrangement of the gears.

As is evident in FIGS. 3 and 4, the temperature drive unit 74 is preferably a set of irregularly shaped gears 90 including an input non-circular shaped gear 92 formed integrally on the temperature input control member 44, an intermediate non-circular shaped gear 94 formed as illustrated and an output non-circular shaped gear 96 formed integrally on the output temperature control member 52. The set of non-circular shaped gears 90 are arranged in the housing 42 so that they cooperatively intermesh in a manner best shown in FIG. 4.

With continued reference to FIGS. 3 and 4, the ventilation mode drive unit 82 is preferably a set of circular shaped gears 100 including by an input circular shaped gear 102 formed integrally on the ventilation mode input control member 46 and an output circular shaped gear 104 formed integrally on the output ventilation mode control member 54. The input and output circular shaped gears 102, 104 cooperatively intermesh thereby providing a drive connection between the input and output ventilation mode control members as best illustrated in FIG. 4.

Figure 6:
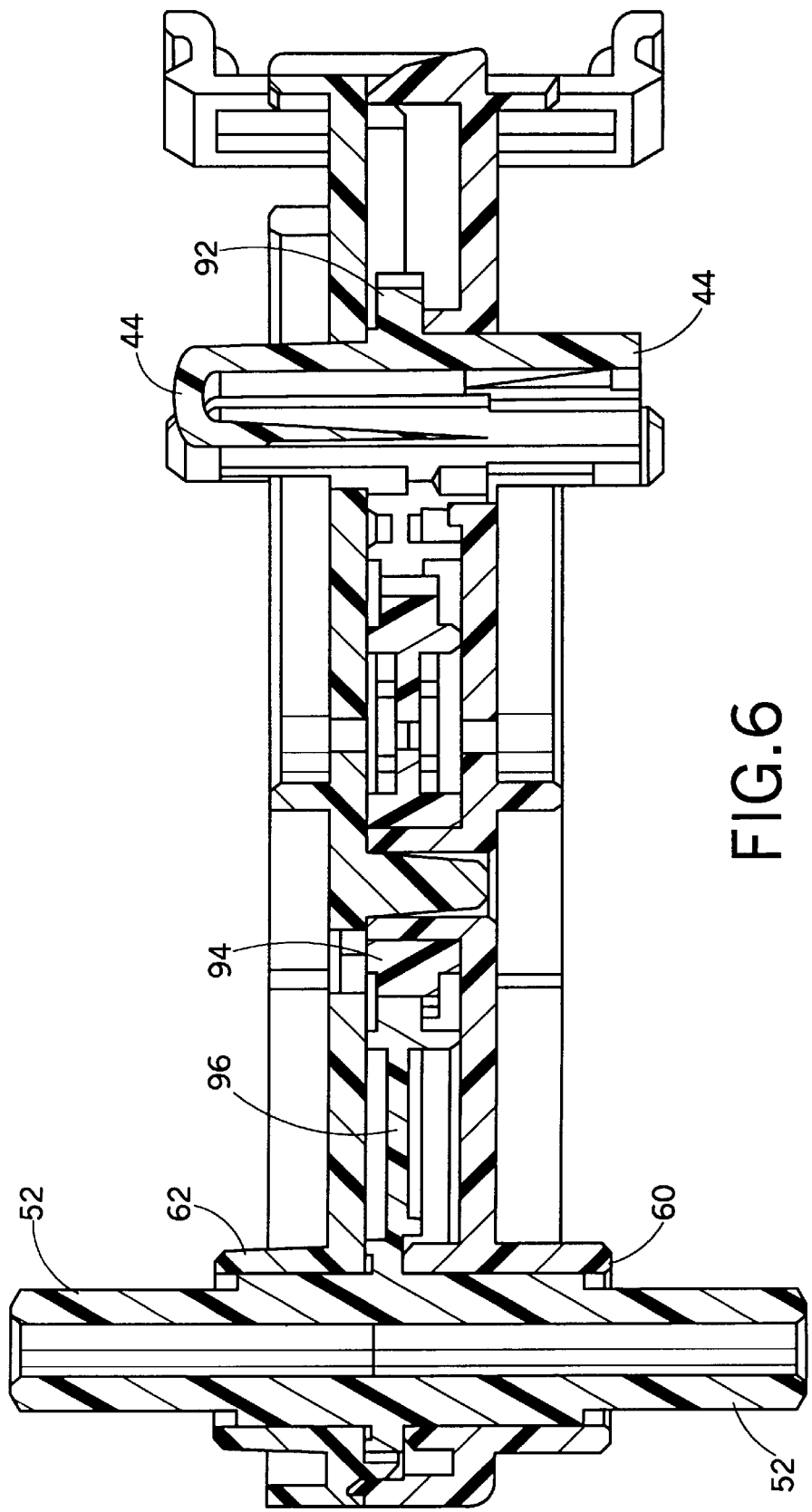
Figure 7:
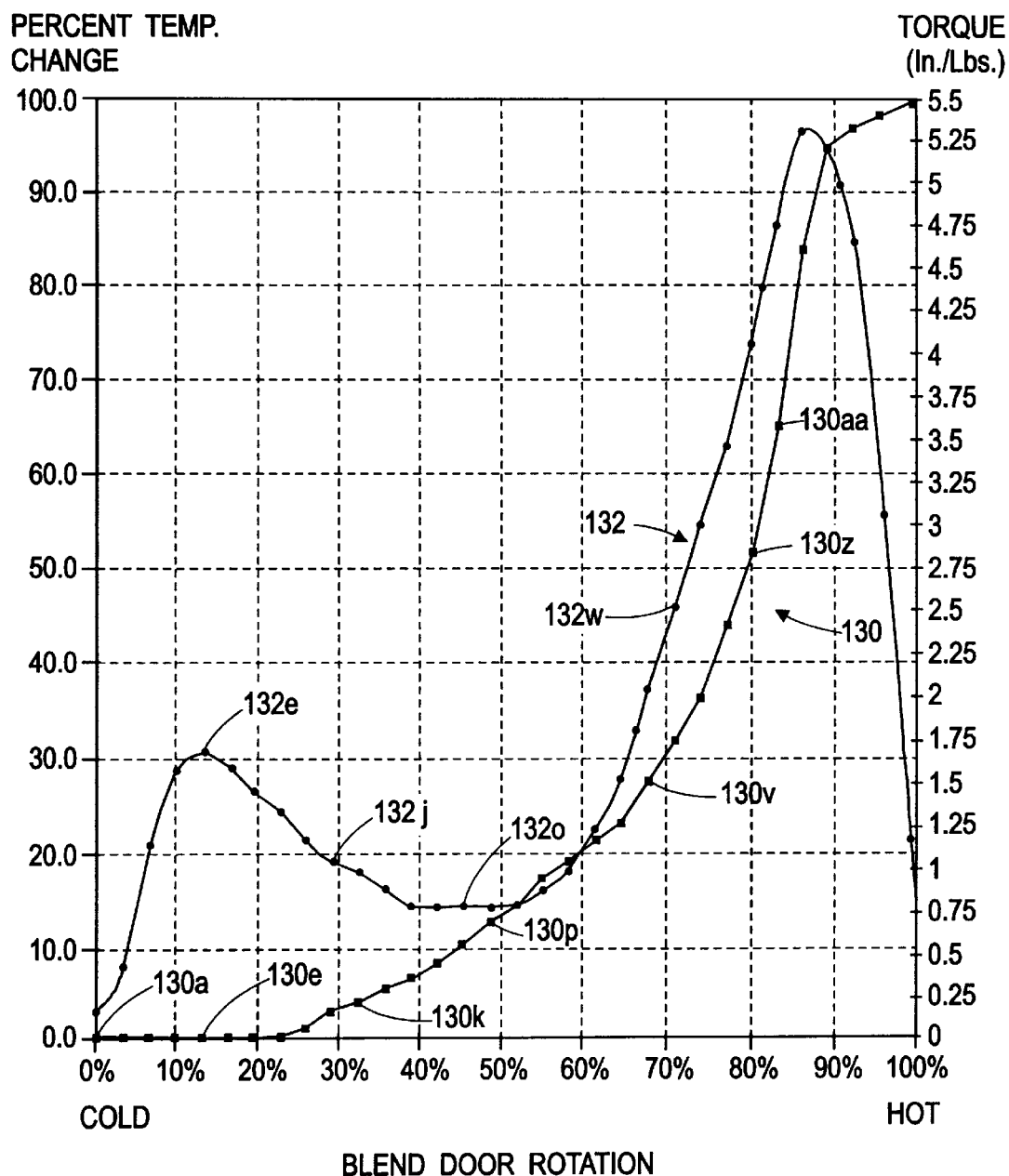
FIG. 7 is a chart illustrating the relationship between the position of the temperature blend door and the resultant blended air stream temperature together with door position against the torque required to hold the blend door in multiple positions against the air stream over its operating range; and, FIG. 8 is a chart illustrating the relationship between the position of the manually operable temperature control knob and the resultant blended air stream temperature together with door position against the torque required to operate the manually rotatable temperature control knob.

Referring again to the lower housing component 60, it will be noted from FIGS. 6 and 7 that a first set of three circular posts 110, 112, and 114 extend vertically upward in a parallel relationship from the left bottom wall 64. The first and third posts 110, 114, define central openings 116, 118 adapted to rotatably receive the output temperature control member 52 and the input temperature control member 44, respectively. The second circular post 112 is arranged to rotatably receive the intermediate non-circular shaped gear 94 thereon and is generally aligned between the first and third circular posts 110, 114. As can be appreciated, the dimensions of the central openings, circular posts, intermediate non-circular shaped gear, and the input and output control members are sized and related to allow the free, but smooth rotary movement between the components comprising the temperature drive unit 74.

With continued reference to the lower housing component 60, it will further be noted that two circular posts 120, 122 extend vertically upward in a parallel relationship from the right bottom wall 66 of the housing 42. The circular posts 120, 122 define a pair of central openings 124, 126 adapted to receive the output and input ventilation mode control members 54, 46, respectively.

In their preferred form, the set of non-circular shaped gears 90 are molded as a single, unitary element integral with the corresponding input and output temperature control members as shown. Similarly, the set of circular shaped gears 100 are molded as a single, unitary element integral with the input and output ventilation mode control members as shown. It should, of course, be understood that the various gears and control members could be formed from a variety of different materials and combinations of materials but, in the subject embodiment, are preferably molded from a plastic or resinous material such as type PA66 nylon.

The design of the required non-circular shaped gears is an empirical process that can be best described with reference to FIGS. 7 and 8. Turning now to those Figures, the design parameters of the subject integrated ventilation mode and temperature control system are based on the characteristics of the particular heating system to which the control system is applied. The first step of the design process is to obtain a plot 130 of output blended air temperature versus blend door angular position together with a plot 132 of blend door torque versus blend door angular position.

The plot 130 of output blended air temperature versus blend door angular position is derived by successively positioning the temperature blend door 14 along a series of angular positions between a first extreme position whereat one hundred percent (100%) cold air is introduced into the passenger compartment and a second opposite extreme position whereat one hundred percent (100%) hot air is introduced into the passenger compartment. In the subject embodiment, thirty two (32) incremental positions were used. At each incremental position between full cold and full hot, the percent temperature change is plotted versus door angular position to derive a set of temperature versus position data points 130a–130ee.

Similarly, at each incremental position between full cold and full hot, the torque required to maintain the temperature blend door 14 at the desired position is measured and plotted 132 versus temperature blend door position to derive a set of blend door torque versus blend door angular position data points 132a–132ee. With that data, the theoretical pitch curve that produces a linear temperature output is determined. Based on the theoretical pitch curve, the theoretical control knob loads are then determined based on the ratios of the non-circular and irregularly shaped gears. The pitch curve is emperically modified as necessary to achieve an acceptable compromise between control knob load linearity and temperature curve linearity.

After the desired theoretical pitch curve is developed, the gear teeth for the intermediate non-circular shaped gear 94 are created on the curve. Next, the teeth for the input and output non-circular shaped gears 92, 96 are created to match the teeth of the intermediate non-circular shaped gear.

The gears 92, 94, and 96 that are generated using this scheme have irregular contours that are unique to each application. Since the gear ratios are continuously variable over the range of movement, the gear shape cannot be solved using linear or circular gear equations. Rather, as discussed above, the preferred iterative empirical process is used.

Figure 8:
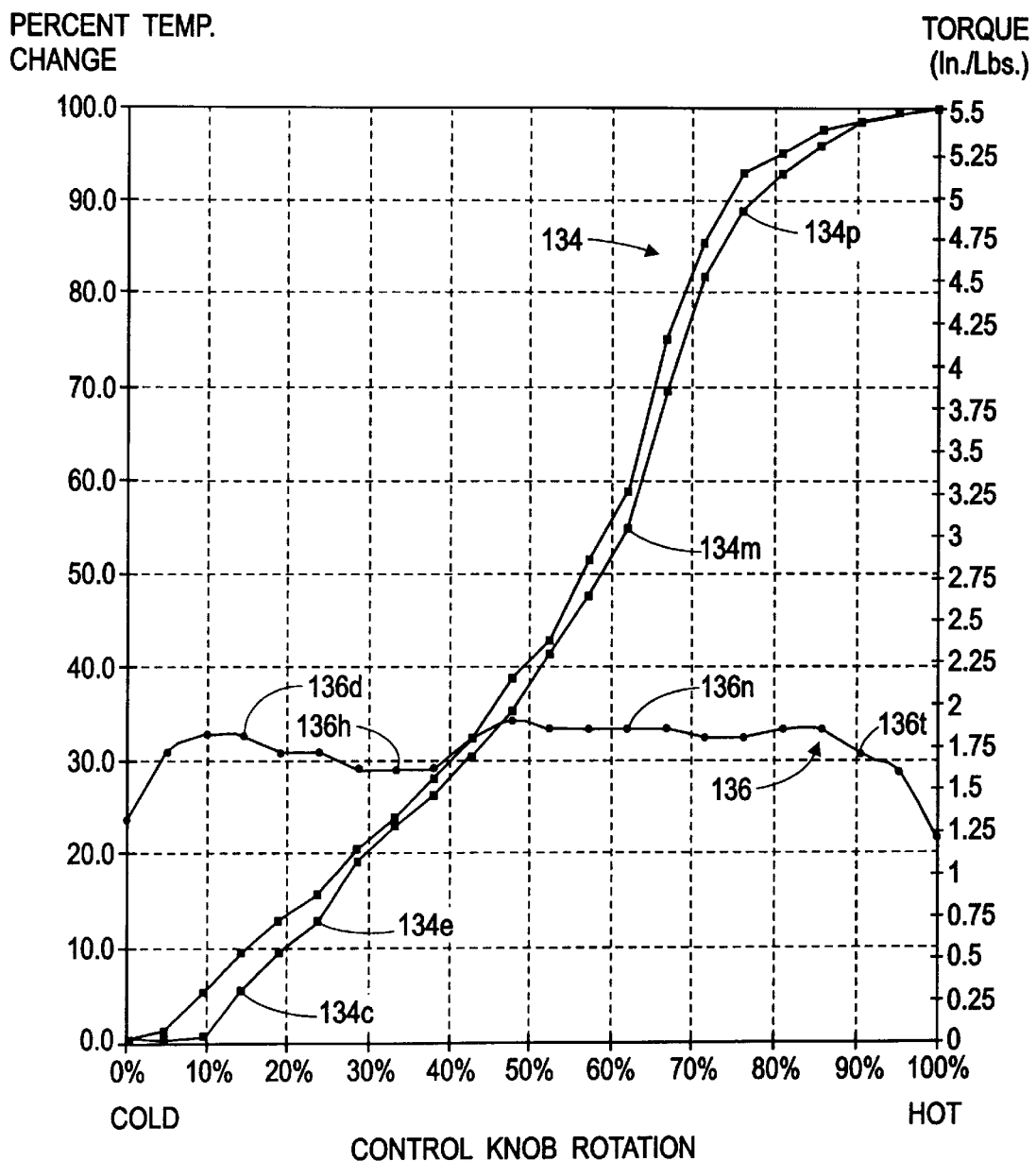

FIG. 8 illustrates a plot 134 of output blended air temperature versus blend door angular position and a plot 136 of temperature control knob torque versus blend door angular position. As can be seen, the plot of output blended air temperature versus blend door angular position is substantially linear between the full cold and full hot positions of the temperature control knob. In addition as shown, the torque required to operate the temperature control knob 12 is substantially linear and constant over the operating range of rotary motion thereof.

As previously mentioned, the actual drive connection between the ventilation mode and temperature knobs and the pull-pull cable systems can vary from that illustrated. In addition, it should be understood that various types of detent mechanisms other than those illustrated could be included while maintaining the overall function and feel of the device to motor vehicle operators.

As can be seen from the foregoing discussions, the subject invention provides an improved integrated ventilation mode and linear temperature control apparatus and allows the input movement of the temperature control knob to be directly related to the temperature control system output. It should further be noted that although the subject ventilation mode drive unit uses circular gears, other gear types and profiles or contours may be used as well to produce a more linear torque relationship between the ventilation mode knob and the ventilation mode dampers. For example, one or more irregular and non-circular shaped gears of the type described above in connection with the temperature control aspects of the subject invention could be used in the ventilation mode control.

The invention has been described with reference to the preferred embodiment. Obviously, modifications and alterations will occur to others upon a reading and understanding of this specification such as, for example, the use of the integrated ventilation mode and temperature control system to regulate and adjust the blending or mixing of one or more fluid streams where fluids other than hot and cold air are encountered such as may be useful and find utility in the chemical or industrial process arts. Further, the subject invention could be used to control other purely mechanical systems including use in motor vehicles such as to operate fuel doors, window regulators, trunk release mechanisms and hydraulic and mechanical mechanisms in transmission type apparatus. In addition, irregularly shaped gears of the type described in connection with temperature control could be used for ventilation mode control where there is a need for a linear relationship between the position of a knob or lever and a ventilation mode setting. The description above is intended, however, to include all such modifications and alterations insofar as they come within the scope of the appended claims or the equivalents thereof.

Having thus described the invention, it is claimed:

1. An integrated ventilation mode and temperature control apparatus for use with a passenger compartment climate control system of a motor vehicle, the apparatus comprising:

a housing;

a movable temperature output control member at said housing for driving a temperature blend door that controls the output temperature of a blended air stream in the climate control system;

a movable ventilation mode output control member at said housing for driving a ventilation mode damper that controls the source and routing of said blended air stream in the climate control system;

a temperature input control member at said housing movable in response to motion of an operatively associated manually operable temperature control knob spaced apart from said housing;

a ventilation mode input control member at said housing movable in response to motion of an operatively associated manually operable ventilation mode control knob spaced apart from said housing;

a first drive unit in said housing providing a first drive connection between the ventilation mode input control member and the ventilation mode output control member for producing movement of said ventilation mode output control member in response to movement of said ventilation mode input control member; and, a second drive unit in said housing providing a second drive connection between the temperature input control member and the temperature output control member for producing a predetermined generally non-linear relationship between movement of the temperature input control member and movement of the temperature output control member to produce a generally linear relationship between the movement of the manually operable temperature control knob and the temperature of the air stream throughout a major portion of the movement of the temperature control knob.

2. The integrated ventilation mode and temperature control apparatus according to claim 1 wherein:

said temperature output control member is a rotary temperature output shaft extending from said housing;

said ventilation mode output control member is a rotary ventilation mode output control shaft extending from said housing;

said temperature input control member is a rotary temperature input shaft extending from said housing; and, said ventilation mode input control member is a rotary ventilation mode input control shaft extending from said housing.

3. The integrated ventilation mode and temperature control apparatus according to claim 2 wherein:

said first drive unit is adapted to produce rotary movement of said ventilation mode output control member in response to rotary movement of said ventilation mode input control member; and, said second drive unit is adapted to produce rotary movement of the temperature output control member in response to rotary movement of said temperature input control member.

4. The integrated ventilation mode and temperature control apparatus according to claim 3 wherein said second drive unit includes a pair of interengaged non-circular shaped gears positioned to transmit said rotary movement of the temperature input control member to said rotary movement of the temperature output control member.

5. The integrated ventilation mode and temperature control apparatus according to claim 3 wherein said second drive unit includes a pair of interengaged irregularly shaped gears positioned to transmit said rotary movement of the temperature input control member to said rotary movement of the temperature output control member.

6. The integrated ventilation mode and temperature control apparatus according to claim 2 wherein:

said temperature input shaft and said temperature output shaft extend from said housing along a first pair of spaced apart parallel axes; and, said ventilation mode input shaft and said ventilation mode output shaft extend from said housing along a second pair of spaced apart parallel axes.

7. The integrated ventilation mode and temperature control apparatus according to claim 6 wherein said first pair of axes are substantially parallel to said second pair of axes.

8. The integrated ventilation mode and temperature control apparatus according to claim 7 wherein:

said temperature output shaft extends from opposite sides of said housing; and, said ventilation mode output shaft extends from opposite sides of said housing.

9. For use in a vehicle climate control system having a temperature control input member drivingly rotated from a manually operable rotary temperature control knob in a passenger compartment of the vehicle and a ventilation mode control input member drivingly rotated from a manually operable ventilation mode control knob in the passenger compartment, a drive assembly for connecting the temperature control input member to a temperature blend door that controls the output temperature of a blended air stream supplied to the passenger compartment of the vehicle and for connecting the ventilation mode control input member to a vent damper that controls the direction of the blended air stream, said drive assembly comprising:

a rotary temperature control output shaft for connection to the temperature blend door;

a rotary ventilation mode output shaft for connection to the vent damper;

a housing into which the temperature control output shaft and the ventilation mode output shaft extend; and, drive means in the housing including:

a first set of gears providing a drive connection between the ventilation mode input shaft and the ventilation mode output shaft for producing a predetermined relationship between rotary movement of the ventilation mode control input member and a position of the vent damper; and, a second set of interengaged irregularly shaped gears providing a drive connection between the temperature control input member and the temperature control output shaft for producing a predetermined generally linear relationship between a position of the temperature blend door and a torque force required to operate the manually operable rotary temperature control knob throughout a major portion of the rotary movement of the temperature control input member.

10. The drive assembly according to claim 9 wherein the second set of interengaged irregularly shaped gears further provide said drive connection between the temperature control input member and the temperature control output shaft for producing a predetermined generally linear relationship between the rotary movement of the temperature control input member and the temperature of the blended air stream supplied to the passenger compartment of the vehicle throughout a major portion of the rotary movement of the temperature control input member.

11. The drive assembly according to claim 10 wherein:

said first set of gears include at least two circular shaped gears; and, said second set of gears include at least two interengaged non-circular shaped gears.

12. The drive assembly according to claim 11 wherein said second set of gears include at least three interengaged non-circular shaped gears carried in said housing for rotation about separate at least three parallel axes.

13. An integrated ventilation mode and temperature control apparatus for use with a passenger compartment climate control system of a motor vehicle, the apparatus comprising:

a housing;

a movable temperature output control member at said housing for driving a temperature blend door that controls the output temperature of a blended air stream in the climate control system;

a movable ventilation mode output control member at said housing for driving a ventilation mode damper that controls the source and routing of said blended air stream in the climate control system;

a temperature input control member at said housing movable in response to motion of an operatively associated manually operable temperature control knob spaced apart from said housing;

a ventilation mode input control member at said housing movable in response to motion of an operatively associated manually operable ventilation mode control knob spaced apart from said housing;

a first drive unit in said housing providing a first drive connection between the ventilation mode input control member and the ventilation mode output control member for producing movement of said ventilation mode output control member in response to movement of said ventilation mode input control member; and, a second drive unit in said housing providing a second drive connection between the temperature input control member and the temperature output control member for producing movement of said temperature output control member in response to movement of the temperature input control member.

14. The apparatus according to claim 13 wherein said second drive unit is adapted to produce a generally non-linear relationship between said movement of the temperature input control member and movement of the temperature output control member to produce a generally linear relationship between the movement of the manually operable temperature control knob and the temperature of the air stream throughout a major portion of the movement of the temperature control knob.

15. The integrated ventilation mode and temperature control apparatus according to claim 14 wherein said second drive unit includes a pair of interengaged non-circular shaped gears positioned to transmit said rotary movement of the temperature input control member to said rotary movement of the temperature output control member.

16. The integrated ventilation mode and temperature control apparatus according to claim 14 wherein said second drive unit includes a pair of interengaged irregularly shaped gears positioned to transmit said rotary movement of the temperature input control member to said rotary movement of the temperature output control member.

* * * * *